United States Patent [19]

Young

[11] Patent Number: 5,063,268

[45] Date of Patent: Nov. 5, 1991

[54] COMPOSITION FOR TIRE TREADS (E-235)

[75] Inventor: Donald G. Young, Cranford, N.J.

[73] Assignee: Exxon Chemical Patents Inc., Linden, N.J.

[21] Appl. No.: 534,861

[22] Filed: Jun. 8, 1990

[51] Int. Cl.$^5$ .................. C08F 8/00; B60C 11/00; C08L 7/00
[52] U.S. Cl. ............................ 524/286; 524/426; 524/427; 524/430; 524/445; 524/495; 525/196; 525/241; 525/214; 525/330.9; 525/333.4; 525/331.7; 525/332.5; 525/332.9; 525/333.2; 525/373; 152/209 R
[58] Field of Search ............ 525/241, 196, 214, 330.9, 525/333.4, 331.7, 332.5, 332.9, 333.2, 373; 524/571, 575.5, 575

[56] References Cited

U.S. PATENT DOCUMENTS

| | | | |
|---|---|---|---|
| 4,012,344 | 3/1977 | Cohen | 260/4 R |
| 4,703,079 | 10/1987 | Ahmed et al. | 524/495 |
| 4,786,680 | 11/1988 | Suzuki et al. | 524/495 |
| 4,814,384 | 3/1989 | Mitchell et al. | 525/211 |

FOREIGN PATENT DOCUMENTS 0344021  11/1989  European Pat. Off. .

*Primary Examiner*—Joseph L. Schofer
*Attorney, Agent, or Firm*—M. L. Gibbons

[57] ABSTRACT

A composition suitable for use in producing tire treads, is provided. The composition comprises a halogen-containing copolymer of a $C_4$ to $C_7$ isomonoolefin and a para-alkylstyrene; a rubber, such as, styrene-butadiene rubber, carbon black, and a plasticizer oil. Tires comprising treads made of the composition are also provided.

28 Claims, No Drawings

COMPOSITION FOR TIRE TREADS (E-235)

BACKGROUND OF THE INVENTION

1. Field of the Invention

The present invention relates to a composition suitable for use in tire treads, particularly in automobile tire treads.

2. Description of Information Disclosures

The use of various rubber blends in compositions suitable for use in producing treads for tires such as automobile tires is known.

U.S. Pat. No. 4,012,344 discloses a tire tread composition comprising a blend of a highly unsaturated rubber such as natural rubber and an elastomeric copolymer of isobutylene and cyclopentadiene containing at least 5 mole percent of cyclopentadiene. The tire tread composition has improved low temperature properties.

U.S. Pat. No. 4,786,680 discloses a tire tread composition comprising natural rubber and/or polyisoprene rubber, a specified styrene-butadiene rubber and halogenated butyl rubber.

There is still a need to improve the performance of tire treads, for example, the wet traction performance of tires.

It has now been found that tire treads that are made from a composition comprising certain halogen-containing copolymers of a $C_4$ to $C_7$ isomonoolefin and a para-alkylstyrene have improved properties.

SUMMARY OF THE INVENTION

In accordance with the invention, there is provided a tire tread composition comprising:

(a) A halogen-containing copolymer of a $C_4$ to $C_7$ isomonoolefin and a para-alkylstyrene:

(b) A rubber selected from the group consisting of natural rubber, styrene-butadiene rubber, polybutadiene rubber, a terpolymer of ethylene, propylene and a nonconjugated diene, and mixtures thereof;

(c) carbon black;

(d) a plasticizer oil, and (e) a curing agent.

In accordance with the invention there is also provided a vulcanized tire comprising a tread, at least a portion of said tread being made of a composition comprising:

(a) A halogen-containing copolymer of a $C_4$ to $C_7$ isomonoolefin and a para-alkylstyrene;

(b) A rubber selected from the group consisting of natural rubber, styrene-butadiene rubber, polybutadiene rubber, a terpolymer of ethylene, propylene and a nonconjugated diene, and mixtures thereof;

(c) carbon black; and (d) a plasticizer oil.

DETAILED DESCRIPTION OF THE INVENTION

The tire tread composition of the present invention comprises a halogen-containing copolymer of a $C_4$ to $C_7$ isomonoolefin and a para-alkylstyrene, a specified rubber other than said halogen-containing copolymer, carbon black, a plasticizer oil and a curing agent with or without curing agent accelerators. Optionally, the composition may comprise fillers other than the carbon black and rubber compounding additives.

Suitable halogen-containing copolymers of a $C_4$ to $C_7$ isomonoolefin and a para-alkylstyrene for use as a component of the present tire tread composition comprise at least 0.5 weight percent of the para-alkylstyrene moiety. For elastomeric copolymer products, the para-alkylstyrene moiety may range from about 0.5 weight percent to about 20 weight percent, preferably from about 1 to about 20 weight percent, more preferably from about 2 to about 20 weight percent of the copolymer. The halogen content of the copolymers may range from above zero to about 7.5 weight percent. The halogen may be bromine, chlorine, and mixtures thereof. Preferably, the halogen is bromine. The major portion of the halogen is chemically bound to the para-alkyl group, that is, the halogen-containing copolymer comprises para-haloalkyl groups.

The copolymers of the isomonoolefin and para-alkylstyrene useful to prepare the halogen-containing copolymers suitable as component of the tire tread composition of the present invention include copolymers of isomonoolefin having from 4 to 7 carbon atoms and a para-alkylstyrene, such as those described in European patent application 89305395.9 filed May 26, 1989, (Publication No. 0344021 published Nov. 29, 1989). The preferred isomonoolefin comprises isobutylene. The preferred para-alkylstyrene comprises para-methylstyrene. Suitable copolymers of an isomonoolefin and a para-alkylstyrene include copolymers having a number average molecular weight ($\overline{M}_n$) of at least about 25,000, preferably at least about 30,000, more preferably at least about 100,000. The copolymers also, preferably, have a ratio of weight average molecular weight ($\overline{M}_w$) to number average molecular weight ($\overline{M}_n$), i.e., $\overline{M}_w/\overline{M}_n$ of less than about 6, preferably less than about 4, more preferably less than about 2.5, most preferably less than about 2. The brominated copolymer of the isoolefin and para-alkylstyrene by the polymerization of these particular monomers under certain specific polymerization conditions now permit one to produce copolymers which comprise the direct reaction product (that is, in their as-polymerized form), and which have unexpectedly homogeneous uniform compositional distributions. Thus, by utilizing the polymerization and bromination procedures set forth herein, the copolymers suitable for the practice of the present invention can be produced. These copolymers, as determined by gel permeation chromatography (GPC) demonstrate narrow molecular weight distributions and substantially homogeneous compositional distributions, or compositional uniformity over the entire range of compositions thereof. At least about 95 weight percent of the copolymer product has a para-alkylstyrene content within about 10 wt. percent, and preferably within about 7 wt. percent, of the average para-alkylstyrene content for the overall composition, and preferably at least about 97 wt. percent of the copolymer product has a para-alkylstyrene content within about 10 wt. percent and preferably within about 7 wt. percent, of the average para-alkylstyrene content for the overall composition. This substantially homogeneous compositional uniformity thus particularly relates to the intercompositional distribution. That is, with the specified copolymers, as between any selected molecular weight fraction the percentage of para-alkylstyrene therein, or the ratio of para-alkylstyrene to isoolefin, will be substantially the same, in the manner set forth above.

In addition, since the relative reactivity of para-alkylstyrene with isoolefin such as isobutylene is close to one, the intercompositional distribution of these copolymers will also be substantially homogeneous. That is, these copolymers are essentially random copolymers, and in any particular polymer chain the para-alkylstyrene and isoolefin units will be essentially randomly distributed throughout that chain.

The halogen-containing copolymers useful in the practice of the present invention have a substantially homogeneous compositional distribution and include the para-alkylstyrene moiety represented by the formula:

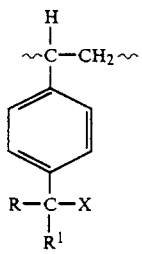

in which R and $R^1$ are independently selected from the group consisting of hydrogen, alkyl preferably having from 1 to 5 carbon atoms, primary alkyl halides, secondary alkyl halides preferably having from 1 to 5 carbon atoms, and mixtures thereof and X is selected from the group consisting of bromine, chlorine and mixtures thereof, such as those disclosed in European patent application 8930595.9 filed May 26, 1989, (Publication No. 0344021 published Nov. 29, 1989).

Various methods may be used to produce the copolymers of isomonoolefin and para-alkylstyrene, as described in said European publication. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvent prior to introducing monomers and catalysts.

Reactors which are typically used in butyl rubber polymerization are generally suitable for use in a polymerization reaction to produce the desired para-alkylstyrene copolymers suitable for use in the process of the present invention. The polymerization temperature may range from about minus 35° C. to about minus 100° C., preferably from about minus 40° to about minus 80° C.

The processes for producing the copolymers can be carried out in the form of a slurry of polymer formed in the diluents employed, or as a homogeneous solution process. The use of a slurry process is, however, preferred, since in that case, lower viscosity mixtures are produced in the reactor and slurry concentration of up to 40 wt. percent of polymer are possible.

The copolymers of isomonoolefins and para-alkylstyrene may be produced by admixing the isomonoolefin and the para-alkylstyrene in a copolymerization reactor under copolymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various halohydrocarbon solvents which are particularly advantageous herein, including methylene, chloride, chloroform, carbon tetrachloride, methyl chloride, with methyl chloride being particularly preferred.

An important element in producing the copolymer is the exclusion of impurities from the polymerization reactor, namely, impurities which, if present, will result in complexing with the catalyst or copolymerization with the isomonoolefins or the para-alkylstyrene, which in turn will prevent one from producing the para-alkylstyrene copolymer product useful in the practice of the present invention. Most particularly, these impurities include the catalyst poisoning material, moisture and other copolymerizable monomers, such as, for example, metal-alkylstyrenes and the like. These impurities should be kept out of the system.

In producing the suitable copolymers, it is preferred that the para-alkylstyrene be at least 95.0 wt. percent pure, preferably 97.5 wt. percent pure, most preferably 99.5 wt. percent pure and that the isomonoolefin be at least 99.5 wt. percent pure, preferably at least 99.8 wt. percent pure and that the diluents employed be at least 99 wt. percent pure, and preferably at least 99.8 wt. percent pure.

The most preferred Lewis acid catalysts are ethyl aluminum dichloride and preferably mixtures of ethyl aluminum dichloride with diethyl aluminum chloride. The amount of such catalysts employed will depend on the desired molecular weight and the desired molecular weight distribution of the copolymer being produced, but will generally range from about 20 ppm to 1 wt. percent and preferably from about 0.001 to 0.2 wt. percent, based upon the total amount of monomer to be polymerized.

Halogenation of the polymer can be carried out in the bulk phase (e.g., melt phase) or either in solution or in a finely dispersed slurry. Bulk halogenation can be effected in an extruder, or other internal mixer, suitably modified to provide adequate mixing and for handling the halogen and corrosive by-products of the reaction. The details of such bulk halogenation processes are set forth in U.S. Pat. No. 4,548,995, which is hereby incorporated by reference.

Suitable solvents for solution halogenation include the low boiling hydrocarbons ($C_4$ to $C_7$) and halogenated hydrocarbons. Since the high boiling point para-methylstyrene makes its removal by conventional distillation impractical, and since it is difficult to completely avoid solvent halogenation, it is very important where solution or slurry halogenation is to be used that the diluent and halogenation conditions be chosen to avoid diluent halogenation, and that residual para-methylstyrene has been reduced to an acceptable level.

With halogenation of para-methylstyrene/isobutylene copolymers, it is possible to halogenate the ring carbons, but the products are rather inert and of little interest. However, it is possible to introduce halogen desired functionality into the para-methylstyrene/isobutylene copolymers hereof in high yields and under practical conditions without obtaining excessive polymer breakdown, cross-linking or other undesirable side reactions.

It should be noted that radical bromination of the enchained para-methyl styryl moiety in the useful copolymers for the practice of this invention can be made highly specific with almost exclusive substitution occurring on the para-methyl group, to yield the desired benzylic bromine functionality. The high specificity of the bromination reaction can thus be maintained over a broad range of reaction conditions, provided, however, that factors which would promote the ionic reaction route are avoided (i.e., polar diluents, Friedel-Crafts catalysts, etc.).

Thus, solutions of the suitable para-methylstyrene/isobutylene copolymers in hydrocarbon solvents such as pentane, hexane or heptane can be selectively brominated using light, heat, or selected radical initiators (according to conditions, i.e., a particular radical initiator must be selected which has an appropriate half-life for the particular temperature conditions being utilized, with generally longer half-lives preferred at warmer hydrogenation temperatures) as promoters of radical halogenation, to yield almost exclusively the desired benzylic bromine functionality, via substitution on the para-methyl group, and without appreciable chain scission and/or cross-linking.

This reaction can be initiated by formation of a bromine atom, either photochemically or thermally (with or without the use of sensitizers), or the radical initiator used can be one which preferentially reacts with a bromine molecule rather than one which reacts indiscriminately with bromine atoms, or with the solvent or polymer (i.e., via hydrogen abstraction). The sensitizers referred to are those photochemical sensitizers which will themselves absorb lower energy photons and disassociate, thus causing, in turn, disassociation of the bromine, including materials such as iodine. It is, thus, preferred to utilize an initiator which has a half life of between about 0.5 and 2500 minutes under the desired reaction conditions, more preferably about 10 to 300 minutes. The amount of initiator employed will usually vary between 0.02 and 1 percent by weight on the copolymer, preferably between about 0.02 and 0.3 percent. The preferred initiators are bis azo compounds, such as azo bis isobutyronitrile (AIBN), azo bis (2,4 dimethyl valero) nitrile, azo bis (2 methyl butyro) nitrile, and the like. Other radical initiators can also be used, but it is preferred to use a radical initiator which is relatively poor at hydrogen abstraction, so that it reacts preferentially with the bromine molecules to form bromine atoms rather than with the copolymer or solvent to form alkyl radicals. In those cases, there would then tend to be resultant copolymer molecular weight loss, and promotion of undesirable side reactions, such as cross-linking. The radical bromination reaction of the copolymers of para-methylstyrene and isobutylene is highly selective, and almost exclusively produces the desired benzylic bromine functionality. Indeed, the only major side reaction which appears to occur is disubstitution at the para-methyl group, to yield the dibromo derivative, but even this does not occur until more than about 60 percent of the enchained para-methylstyryl moieties have been monosubstituted. Hence, any desired amount of benzylic bromine functionality in the monobromo form can be introduced into the above stated copolymers, up to about 60 mole percent of the para-methylstyrene content.

It is desirable that the termination reactions be minimized during bromination, so that long, rapid radical chain reactions occur, and so that many benzylic bromines are introduced for each initiation, with a minimum of the side reactions resulting from termination. Hence, system purity is important, and steady-state radical concentrations must be kept low enough to avoid extensive recombination and possible cross-linking. The reaction must also be quenched once the bromine is consumed, so that continued radical production with resultant secondary reactions (in the absence of bromine) do not then occur. Quenching may be accomplished by cooling, turning off the light source, adding dilute caustic, the addition of a radical trap, or combinations thereof.

Since one mole of HBr is produced for each mole of bromine reacted with or substituted on the enchained para-methylstyryl moiety, it is also desirable to neutralize or otherwise remove this HBr during the reaction, or at least during polymer recovery in order to prevent it from becoming involved in or catalyzing undesirable side reactions. Such neutralization and removal can be accomplished with a post-reaction caustic wash, generally using a molar excess of caustic on the HBr. Alternatively, neutralization can be accomplished by having a particulate base (which is relatively non-reactive with bromine) such as calcium carbonate powder present in dispersed form during the bromination reaction to absorb the HBr as it is produced. Removal of the HBr can also be accomplished by stripping with an inert gas (e.g., $N_2$) preferably at elevated temperatures.

The brominated, quenched, and neutralized para-methylstyrene/isobutylene copolymers can be recovered and finished using conventional means with appropriate stabilizers being added to yield highly desirable and versatile functional saturated copolymers.

In summary, halogenation to produce a copolymer useful in the present invention is preferably accomplished by halogenating an isobutylene-para-methylstyrene copolymer using bromine in a normal alkane (e.g., hexane or heptane) solution utilizing a bis azo initiator, e.g., AIBN or VAZO® 52: 2,2'-azobis(2,4-dimethylpentane nitrile), at about 55° to 80° C., for a time period ranging from about 4.5 to about 30 minutes, followed by a caustic quench. The recovered polymer is washed in basic water wash and water/isopropanol washes, recovered, stabilized and dried.

The halogenated copolymer of the $C_4$ to $C_7$ isomonoolefin and a para-alkylstyrene may suitably be present in the composition of the present invention in an amount of at least about 3 weight percent, preferably at least about 5 weight percent, and may range from about 3 weight percent to about 30 weight percent, based on the weight of the total composition.

In addition to the halogen-containing copolymer of a $C_4$ to $C_7$ isomonoolefin and a para-alkylstyrene, the tire tread composition of the present invention also comprises a rubber component (b) of certain rubbers, carbon black, a plasticizer oil, and a curing agent.

Suitable rubber components (b) for the composition of the present invention in addition to the halogen-containing copolymer of the isomonoolefin and the para-alkylstyrene, are rubbers selected from the group consisting of natural rubber, styrene-butadiene rubber, polybutadiene rubber, a terpolymer of ethylene, propylene, and a nonconjugated diene (EPDM), and mixtures thereof. The additional rubber component (b) may be an oil extended rubber of these suitable rubbers.

The styrene-butadiene rubber referred to herein is also known as poly(butadiene-co-styrene), and includes rubbers prepared by emulsion (hot and cold) and solution processes well known in the art. Bound styrene levels may range from about 3 to about 50 weight percent, preferably from about 10 to about 45 weight percent, more preferably from about 12 to 30 weight percent. Generally such polymers have Mooney viscosity values measured at 100° C. ranging from about 20 to 130 and above, preferably from about 35 to 80. The butadiene in such copolymers may be present as all three geometric isomers, cis-1,4, trans-1,4 and 1,2 or vinyl and the copolymer may be random, block or graft. The styrene-butadiene rubber component may be an oil extended styrene-butadiene rubber.

The polybutadiene polymer rubber referred to herein includes the geometric isomers thereof, all of which may be prepared by processes well known in the art. In general, such polymers have a molecular weight of from about 500 to about 500,000, preferably from about 1500 to about 200,000. Generally, polybutadiene rubbers have Mooney viscosity values, measured at 100° C. ranging from about 25 to about 65, preferably from about 35 to about 55.

The terpolymer of ethylene, propylene, and a nonconjugated diene (EPDM) referred to herein generally comprises from about 20 to about 90 weight percent ethylene. The diene content of the EPDM may range from about 0.1 to about 15 weight percent. The EPDM will generally have a weight average molecular weight in the range of about 10,000 to about 1,000,000 or higher. The diene monomers are selected from polymerizable nonconjugated dienes having from 6 to 15 carbon atoms, such as, for example, 5-ethylidene-2-norbornene (ENB); 1,4-hexadiene: 5-methylene-2-norborene (MNB); 1,6-octadiene; 5-methyl-1,4-hexadiene; 3,7-dimethyl-1,6-octadiene; 1,3-cyclopentadiene; 1,4-cyclohexadiene; tetrahydroindene; methyltetrahydroindene; dicyclo-pentadiene; 5-isopropylidene-2-norbornene; 5-vinylnorbornene, etc.

The preferred rubbers are natural rubber, styrene-butadiene rubber, polybutadiene rubber, and mixtures thereof.

Furthermore, the composition may, optionally, comprise a component selected from the group consisting of a filler other than carbon black, a rubber compounding additive and mixtures thereof. The carbon black may be derived from any source. Suitable carbon black includes channel black, furnace black, thermal black, acetylene black, lamp black and the like. Preferably the carbon black has an average mean particle diameter under 35 nm, such as grades N 110, N 234, N 330 or N 339 or mixtures thereof (ASTM D-3849).

Suitable plasticizer oils include hydrocarbon plasticizer oils such as paraffinic, naphthenic or aromatic petroleum oils. The preferred plasticizer oil is a naphthenic petroleum oil. Suitable hydrocarbon plasticizer oils include oils having the following general characteristics:

| Property | Preferred | Minimum | Maximum |
| --- | --- | --- | --- |
| API° gravity at 60° F. | 15–30 | 10 | 35 |
| Flash Point, °F. (open cup method) | 330–450 | 300 | 700 |
| Pour Point, °F. | −30 to +30 | −35 | 60 |
| SSU at 100° F. | 100–7,000 | 50 | 20,000 |

Optionally, the tire tread composition of the present invention may comprise a component selected from the group consisting of a filler (other than carbon black), a rubber compounding additive and mixtures thereof. The filler and/or additive may be any conventional filler and/or additive generally used with rubber.

The optional other filler may be a non-reinforcing filler, a reinforcing filler, an organic filler, and an inorganic filler.

Suitable fillers, other than carbon black, include calcium carbonate, clay, silica, talc, titanium dioxide and mixtures thereof. Suitable rubber compounding additives include antioxidants, stabilizers, rubber processing aids, pigments and mixtures thereof. The rubber processing aids may be modified process oils. Suitable antioxidants include hindered phenols, amino phenols, hydroquinones, alkyldiamines, amine condensation products and the like. The preferred additives are fatty acids, low molecular weight polyethylene, waxes and mixtures thereof. A preferred fatty acid is stearic acid. Mixtures of other fatty acids can be used with the stearic acid.

The tire tread composition of the present invention also comprises a curing agent. Any known curative system suitable for vulcanization of rubber may be used.

Suitable curing agents include peroxide cures, sulfur cures, sulfur donor cures, and non-sulfur cures. For example, the curing agent may be zinc oxide. Optionally, curing agent accelerators may be used such as dithiocarbamates, thiurams, thioureas, and mixtures thereof. Zinc oxide-free cures may also be used such as, for example, litharge, 2-mercaptoimidazoline, and diphenyl guanidine; 2-mercaptobenzimidazole, and N,N'-phenylenebismaleimide. Organic peroxide may be used as curing agents, such as, for example, dicumyl peroxide, benzoyl peroxide, α, α'-Bis(tertiary butyl peroxy) diisopropyl benzene, and the like.

The curing agent may be a resin curative such as, phenolic resins, brominated phenolic resins, urethane resin, etc.

Suitable curing agents include resin curative such as those described in U.S. Pat. No. 3,287,440 and U.S. Pat. No. 4,059,651, the teachings of which are hereby incorporated by reference.

The tire tread composition of the present invention comprises the halogen-containing copolymer of a $C_4$ to $C_7$ isomonoolefin and a para-alkylstyrene suitably in an amount ranging from about 3 to 30, preferably from about 5 to about 15 weight percent, the other rubber component (b) suitably in an amount ranging from about 25 to about 50 weight percent, preferably from about 30 to about 40 weight percent, the carbon black suitably in an amount ranging from about 20 to about 50, preferably from about 25 to about 40 weight percent; the plasticizer oil suitably in an amount ranging from above 0 to about 25, preferably from about 5 to about 20 weight percent; the total amount of other fillers and additives suitably in an amount ranging from about 3 to about 15, preferably from about 4 to about 8 weight percent; and the curing agent suitably in an amount ranging from about 1.5 to 6, preferably from about 2 to 4 weight percent, all said percentages being based on the weight of the total composition.

The tire tread composition of the present invention may be vulcanized by subjecting it to heat or radiation according to any conventional vulcanization process. Typically, the vulcanization is conducted at a temperature ranging from about 100° C. to about 250° C., preferably from about 150° C. to about 200° C., for a time period ranging from about 1 to about 150 minutes.

Suitable tire tread compositions may be prepared by using conventional mixing techniques including, e.g., kneading, roller milling, extruder mixing, internal mixing (such as with a Banbury ® mixer), etc. The sequence of mixing and temperatures employed are well known to the skilled rubber compounder, the objective being the dispersion of fillers, activators and curatives in the polymer matrix without excessive heat buildup. A useful mixing procedure utilizes a Banbury mixer in which the copolymer rubber, the other rubber component (b), carbon black and plasticizer are added and the composition mixed for the desired time or to a particular temperature to achieve adequate dispersion of the ingredients. Alternatively, the copolymer rubber, rubber component (b) and a portion of the carbon black (e.g., one-third to two-thirds) is mixed for a short time (e.g., about 1 to 3 minutes) followed by the remainder of the carbon black and oil. Mixing is continued for about 1 to 3 minutes at high rotor speed during which time the mixed compound reaches a temperature of about 140° C. Following cooling, the compound is mixed in a second step on a rubber mill or in a Banbury® mixer during which the curing agents are thoroughly and uniformly dispersed at relatively low temperature, e.g., about 80° to about 105° C. Variations in mixing will be readily apparent to those skilled in the art and the present invention is not limited by the mixing procedure. The mixing is performed to disperse all components of the composition thoroughly and uniformly.

Vulcanization of a molded article, for example a tire tread, may be carried out in heated presses under conditions well known to those skilled in the art.

It is preferred that vulcanization be effected at temperatures of about 140° to about 85° C. and for periods of about 10 to about 60 minutes. Curing time will be affected by the thickness of the article to be molded and the concentration and type of curing agent as well as halogen and unsaturation content of the halogenated copolymer. However, the vulcanization parameters can readily be established with a few experiments utilizing e.g., a laboratory characterization device well known in the art, the Monsanto Oscillating Disc Cure Rheometer (described in detail in American Society for Testing and Materials, Standard ASTM D 2084).

The tire tread composition of the present invention may be used for the production of treads for any type of rubber tires, for example, motor vehicles tires, such as passenger automobile tires, truck tires, motorcycle tires, and the like. The tires typically comprise an outer surface comprising a tread portion (area) and sidewalls. The composition of the present invention may be used to produce at least a part of the tread portion.

The tire, including the tread portion, may be produced by any conventional method.

The following examples are presented to illustrate the invention.

EXAMPLE

Experiments were performed to compare a formulation in accordance with the present invention to formulations comprising other copolymers in a typical tire tread formulation. Results are summarized in Table I. Formulations C and D were formulations (i.e. compositions) in accordance with the present invention. Formulations A, and B were not formulations in accordance with the present invention.

Copolymer T was Exxon Bromobutyl rubber grade 2244 (Exxon Chemical Company).

Copolymer Y was a brominated isobutylene-para methylstyrene 5 wt. % paramethylstyrene (PMS); 0.7 mole % Br.

Copolymer X was a brominated isobutylene-para methylstyrene, 14 wt. % PMS and 1.6 mole % Br.

Copolymer W was a polybutadiene with divinylbenzene modifier, oil extended. The oil was an aromatic oil (37.5 parts of oil per hundred parts of rubber), BUDENE 1255 (Goodyear Chemical Co.).

The Mooney Viscosities in Table I were measured in accordance with ASTM D-1646. The ingredients used in the formulations are shown in Table II. The test methods used to measure the properties shown in Table I are shown in Table III. The amounts shown in Table I are parts per hundred parts of rubber hydrocarbon excluding oil.

TABLE I

| FORMULATION | A | B | C | D |
|---|---|---|---|---|
| Copolymer T | 20 | — | — | — |
| Copolymer Y | — | — | 20 | — |
| Copolymer X | — | — | — | 20 |
| Copolymer W | 55 | 61.88 | 55 | 55 |
| BR, Cisdene 1203 | 30 | 35 | 30 | 30 |
| NR, SMR 20 | 10 | 20 | 10 | 10 |
| N-351 Black | 65 | 65 | 65 | 65 |
| Flexon 580 Oil | 13 | 11.12 | 13 | 13 |
| Struktol 40 MS | 2 | 2 | 2 | 2 |
| Stearic Acid | 0.5 | 0.5 | 0.5 | 0.5 |
| Sunolite 100 Wax | 2.5 | 2.5 | 2.5 | 2.5 |
| Santoflex 13 | 1.2 | 1.2 | 1.2 | 1.2 |
| Zinc Oxide | 3 | 3 | 3 | 3 |
| Crystex S 90-HS-OT20 | 3 | 3 | 3 | 3 |
| DIBS, Santocure IPS | 1.8 | 1.8 | 1.8 | 1.8 |
| TBBS, Santocure NS | 0.3 | 0.3 | 0.3 | 0.3 |
| Santogard PVI | 0.1 | 0.1 | 0.1 | 0.1 |
| MS, T10 at 135 C. | 30 | 35 | 34 | 33 |
| ML, 1 + 8 at 100 C. | 55 | 58 | 60 | 69 |
| Rheometer Cure at 160 C. | | | | |
| t'90 | 15.3 | 15.7 | 16.8 | 16.2 |
| $M_H - M_L$ | 30 | 29 | 29 | 30 |
| Tensile Properties, Cured 20 Min. at 160 C. | | | | |
| Hardness, Shore A | 64 | 63 | 65 | 65 |
| 100% Modulus, MPa | 3.12 | 2.44 | 3.10 | 3.59 |
| Tensile, MPa | 10.3 | 12.3 | 12.3 | 12.1 |
| Elongation, % | 240 | 320 | 290 | 270 |
| Dynamic Properties, Simple Shear Cured 25 Min. at 160 C. | | | | |
| Energy Test: 25 C., 12 HZ, ±5% Strain | | | | |
| tan delta | 0.187 | 0.175 | 0.198 | 0.220 |
| G", N/mm$^2$ | 0.415 | 0.332 | 0.414 | 0.573 |
| Wet Traction Test: 0 C., 100 Hz, ±70N Load | | | | |
| tan delta | 0.265 | 0.186 | 0.309 | 0.311 |
| G", N/mm$^2$ | 0.771 | 0.487 | 1.088 | 1.352 |
| Pico Abrasion Test: Cured 25 Min. at 160 C. | | | | |
| Standard Load: 4.5 kg | 93.5 | 92.5 | 86.5 | 88.5 |

TABLE II

| Ingredient | Description and Trademark Owner |
|---|---|
| BR, Cisdene 1203 | Polybutadiene, American Synthetic Rubber |
| NR, SMR20 | Natural rubber, Malaysian Rubber Products Assoc. |
| N-351 Black | Carbon black, ASTM type N-351 |
| FLEXON 580 oil | Naphthenic process oil, Exxon Co., USA |
| Struktol 40 MS | Mixture of aliphatic-naphthenic-aromatic resins, Struktol Co. |
| Sunolite 100 Wax | Blend of petroleum waxes, Witco Chemical Co. |
| Santoflex 13 | N,N'-phenyl-p-phenylene diamine, Monsanto Chem. Co. |
| Crystex S90 HS-OT20 | Polymerized sulfur; oil treated, Stauffer Chem. Co. |
| DIBS, Santocure IPS | N,N'-diisopropyl-2-benzothiazole-sulfenamide, Monsanto Chemical Co. |
| TBBS, Santocure NS | N-tertiary butyl-2-benzothiazole-sulfenamide, Monsanto Chem. Co. |
| Santogard PVI | Scorch inhibitor, Monsanto Chem Co. |

TABLE III

| Property | Test |
|---|---|
| Rheometer Cure | ASTM D2084 |
| Hardness, Shore A | ASTM D2240 |

TABLE III-continued

| Property | Test |
| --- | --- |
| Elongation | ASTM D412 |
| Energy Test | MTS 831 Elastomer Test System (MTS Systems Corporation) |
| Wet Traction Test | MTS 831 Elastomer Test System (MTS Systems Corpoation) |
| Pico Abrasion Test | ASTM D2229 |

As shown in Table I, formulations C and D, which were formulations in accordance with the present invention, showed better results in the wet traction test (G", loss modulus) at 0° C. than formulations A and B, which were formulations which were not in accordance with the present invention. The loss modulus at 0° C. is used to predict wet traction performance of tires.

What is claimed is:

1. A tire tread composition comprising:
   (a) halogen-containing copolymer of a $C_4$ to $C_7$ isomonoolefin and a para-alkylstyrene;
   (b) a rubber selected from the group consisting of natural rubber, styrene-butadiene rubber, polybutadiene rubber, a terpolymer of ethylene, propylene and a nonconjugated diene, and mixtures thereof;
   (c) carbon black;
   (d) a plasticizer oil; and
   (e) a curing agent.

2. The vulcanized tire tread composition of claim 1.

3. The tire tread composition of claim 1 additionally comprising a component selected from the group consisting of a filler other than carbon black, a rubber compounding additive and mixtures thereof.

4. The tire tread composition of claim 1, wherein said copolymer is present in an amount ranging from about 3 to about 30 weight percent; said rubber (b) is present in an amount ranging from about 25 to about 50 weight percent; said carbon black is present in an amount ranging from about 20 to about 50 weight percent, said plasticizer oil is present in an amount ranging from above 0 to about 25 weight percent, and said curing agent is present in an amount ranging from about 1.5 to about 6 weight percent, based on the total tire tread composition.

5. The tire tread composition of claim 1, wherein said copolymer comprises from about 0.5 to about 20 weight percent of said para-alkylstyrene.

6. The tire tread composition of claim 1, wherein said copolymer comprises from an effective amount above zero to about 7.5 weight percent of said halogen.

7. The tire tread composition of claim 1, wherein said halogen is selected from the group consisting of chlorine, bromine, and mixtures thereof.

8. The tire tread composition of claim 1, wherein said halogen comprises bromine, and wherein said bromine is chemically bound to said para-alkylstyrene.

9. The tire tread composition of claim 1, wherein said isomonoolefin is isobutylene and said para-alkylstyrene is para-methylstyrene.

10. The tire tread composition of claim 1 wherein said oil plasticizer is a naphtenic oil, and wherein said rubber (b) is selected from the group consisting of natural rubber, styrene-butadiene rubber, polybutadiene rubber, and mixtures thereof.

11. The tire tread composition of claim 3, wherein said component is a filler and wherein said filler is selected from the group consisting of clay, silica, calcium carbonate, titanium dioxide and mixtures thereof.

12. The tire tread composition of claim 3, wherein said component is a rubber compounding additive and wherein said rubber compounding additive is selected from the group consisting of antioxidants, stabilizers, pigments, rubber processing aids and mixtures thereof.

13. The tire tread composition of claim 1 wherein said curing agent comprises zinc oxide.

14. A vulcanized tire comprising a tread, at least a portion of said tread being made of a composition comprising:
   (a) a halogen-containing copolymer of a $C_4$ to $C_7$ isomonoolefin and a para-alkylstyrene;
   (b) a rubber selected from the group consisting of natural rubber, styrene-butadiene rubber, polybutadiene rubber, a terpolymer of ethylene propylene and a nonconjugated diene, and mixtures thereof;
   (c) carbon black; and
   (d) a plasticizer oil.

15. The vulcanized tire of claim 14, wherein said composition additionally comprises a component selected from the group consisting of a filler other than carbon black, a rubber compounding additive and mixtures thereof.

16. The vulcanized tire of claim 14, wherein said composition comprises from about 3 to about 30 weight percent of said copolymer; from about 25 to about 50 weight percent of said rubber (b); from about 20 to about 50 weight percent of carbon black; and from above 0 to 25 weight percent of said plasticizer oil.

17. The vulcanized tire of claim 14 wherein said plasticizer oil comprises a naphthenic oil, and wherein said rubber (b) is selected from the group consisting of natural rubber, styrene-butadiene rubber, polybutadiene rubber, and mixtures thereof.

18. The vulcanized tire of claim 14, wherein said copolymer comprises from about 0.5 to about 20 weight percent of said para-alkylstyrene.

19. The vulcanized tire of claim 14, wherein said copolymer comprises from an effective amount above zero to about 7.5 weight percent of said halogen.

20. The vulcanized tire of claim 14, wherein said halogen is selected from the group consisting of chlorine, bromine, and mixtures thereof.

21. The vulcanized tire of claim 14, wherein said halogen comprises bromine, and wherein said bromine is chemically bound to said para-alkylstyrene.

22. The vulcanized tire of claim 14, wherein said isomonoolefin is isobutylene and said para-alkylstyrene is para-methylstyrene.

23. The vulcanized tire of claim 15, wherein said component is a filler, and wherein said filler is selected from the group consisting of clay, silica, calcium carbonate, titanium dioxide, and mixtures thereof.

24. The vulcanized tire of claim 15, wherein said component is a rubber compounding additive and wherein said rubber compounding additive is selected from the group consisting of antioxidants, stabilizers, pigments, rubber processing aids, and mixtures thereof.

25. The vulcanized tire of claim 14, wherein said tire is a motor vehicle tire.

26. The tire tread composition of claim 8, wherein said bromine which is chemically bound to said para-alkylstyrene is present in up to about 60 mole percent of the content of said para-alkylstyrene.

27. The vulcanized tire of claim 21, wherein said bromine which is chemically bound to said para-alkylstyrene is present in up to about 60 mole percent of the content of said para-alkylstyrene.

28. The vulcanized tire of claim 14, wherein said tire is improved wet traction performance.

* * * * *